Sept. 4, 1956 R. M. SNYDER 2,761,895

SYNCHRONIZING CIRCUIT

Filed Nov 21, 1952 2 Sheets-Sheet 1

*INVENTOR.*
ROBERT M. SNYDER

*BY*

*Lockwood, Galt, Woodard, & Smith*
ATTORNEYS

Sept. 4, 1956 R. M. SNYDER 2,761,895

SYNCHRONIZING CIRCUIT

Filed Nov 21, 1952 2 Sheets-Sheet 2

INVENTOR
ROBERT M. SNYDER

United States Patent Office 2,761,895

Patented Sept. 4, 1956

2,761,895

SYNCHRONIZING CIRCUIT

Robert M. Snyder, Los Angeles, Calif., assignor to International Telephone and Telegraph Corporation, a corporation of Maryland Application November 21, 1952, Serial No. 321,879

16 Claims. (Cl. 178—69.5)

The present invention relates to a synchronizing circuit and particularly to a circuit for obtaining interlace scanning in television systems.

According to conventional practice, interlace scanning is obtained by employing circuitry which achieves an accurately controlled sweep frequency ratio between horizontal and vertical sweep circuits, such as the ratio of 262.5 to 1. In following this method, successful operation depends upon the operation of impulse counter circuits which establish a precise critical ratio between the output frequencies of the horizontal and vertical sweep circuits.

It is therefore an object of this invention to provide a scanning method in a television system for obtaining interlace scanning which will eliminate the necessity of maintaining a precise ratio between the output frequencies of the vertical and horizontal sweep circuits.

It is another object of this invention to obtain interlace scanning impulses which are grouped into two distinct sequentially occurring fields or time patterns in which the impulses in one field occur at regularly spaced time intervals and the impulses in the other field occur at similarly spaced intervals but offset in time relation with respect to the impulses of the first field.

It is still another object of this invention to obtain interlace scanning control by the use of a single frequency generating oscillator used to produce two equal alternating frequency outputs which are exactly 180 degrees out of phase and which are alternately translated into groups of horizontal sweep pulses, with the groups spaced apart in time an amount corresponding to the aforementioned 180 degree phase relation.

It is yet another object of this invention to obtain an interlace scanning circuit for television systems which is simple in design, reliable in operation, and economical in its construction.

Other objects will become apparent as the description proceeds.

In accordance with the present invention there is provided a synchronizing circuit having horizontal and vertical sweep outputs which vary alternately in time relation to produce interlace sweep. This circuit comprises a stable source of high frequency alternating voltage such as a crystal controlled oscillator which produces two identical outputs 180 degrees out of phase with each other, a full wave gated rectifier coupled to the oscillator, and a stable source of low frequency voltage such as a multivibrator also having two outputs 180 degrees out of phase which are fed to said rectifier. The rectifier and the multivibrator are so arranged that only the positive portions of the two outputs of the oscillator will be alternately conducted through to the rectifier output in sequential groups.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
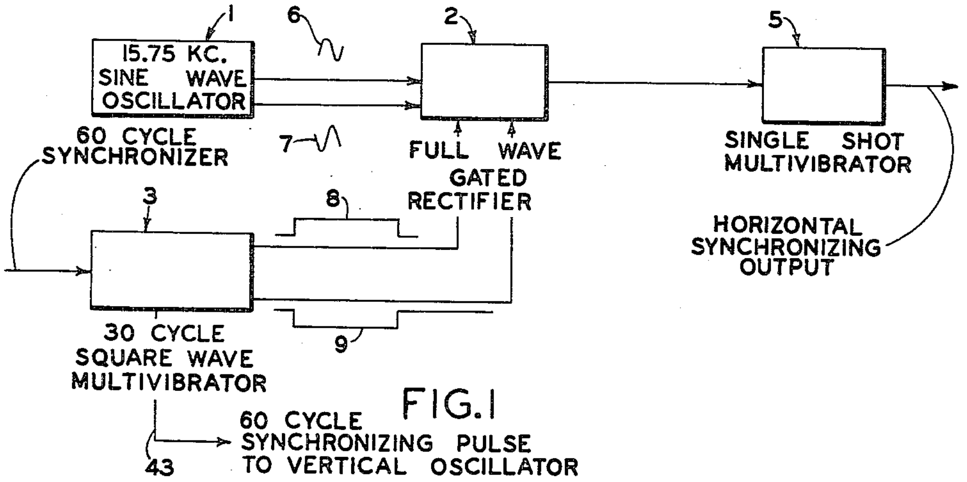
Fig. 1 is a block diagram of a synchronizing circuit embodying the present invention.

Referring to the drawings, and more particularly to Fig. 1, a sine wave oscillator 1 having a suitable degree of frequency stability is provided with two identical signal outputs which are 180 degrees out of phase. These outputs are fed to a full wave gated rectifier 2 which also has fed thereto two identical frequency square wave signals, also 180 degrees out of phase, from a low frequency generating source or multivibrator 3. Typical frequency values for the oscillator 1 and the multivibrator 3 may be 15.75 kc. and 30 cycles per second respectively. A 60 cycle synchronizing voltage is used to synchronize the output signals of the source 3, these being square waves 180 degrees out of phase. A 60 cycle synchronizing pulse may be taken from this source 3 for the synchronization of the vertical sweep applied to the television camera or picture tube.

The output of the gated rectifier 2 may be fed to a single shot multivibrator 5 or other suitable triggering circuit which responds only to input pulses received from the rectifier 2.

The output of the multivibrator 5 may be considered as the horizontal synchronizing signal and may be coupled to the usual sweep voltage generating circuits.

Generally speaking, the function of the aforedescribed circuitry is as follows. As illustrated, the sine wave outputs from the oscillator 1, indicated by the reference numerals 6 and 7, respectively, are exactly equal in frequency but 180 degrees out of phase. Similarly, the outputs from the multivibrator 3 are represented by the two waves 8 and 9 which occur at the rate of 30 cycles per second but which are also 180 degrees out of phase.

Figure 3:
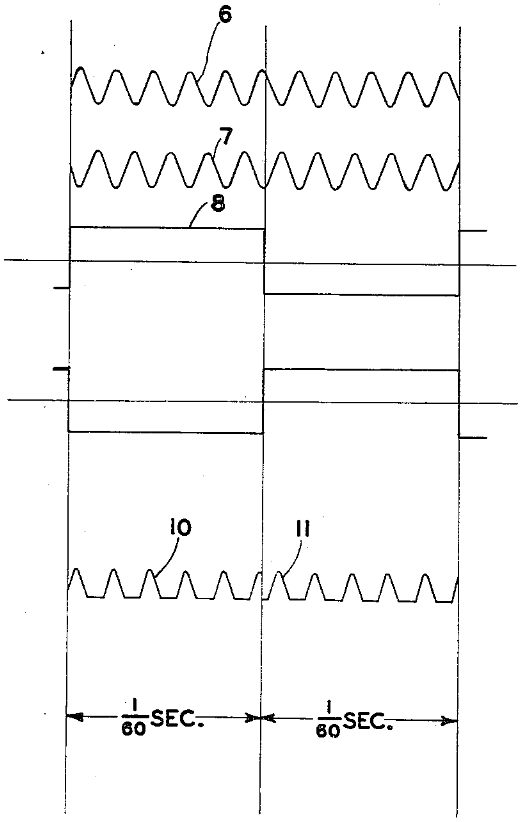
Fig. 3 is a plot of the waveforms derived from the various stages of the circuit as indicated.

The rectifier circuit 2 is so arranged as to be conductive only when the square wave outputs 8 and 9 are passing through their respective positive cycles, and is still further arranged so as to conduct through the output of rectifier 2 the positive portions of the sine wave 6 during the period of the positive cycle of square wave 8, and the positive portions of the sine wave 7 during the positive portion of the square wave 9. Thus, as seen in Fig. 3, a series of positive half sine wave pulses 10 will be produced for the duration of the positive portion of the square wave 8. Then, as the square wave 8 goes negative and the wave 9 goes positive, the positive half cycles of the sine wave 7 are conducted so as to produce the rectifier output 11. Since the sine waves 6 and 7 are exactly 180 degrees out of phase, it is seen that the fields or groups 10 and 11 are spaced 180 degrees apart.

Now, if the pulses in the field 10 are used for the horizontal sweep frequency, a vertical sweep of 1/60 of a second will produce a series of vertically spaced horizontal lines having a spacing therebetween corresponding to the frequency as is well known in the art. Since the pulses 11 are spaced 180 degrees out of phase with the pulses 10, the next vertical sweep pulse will serve to produce a similar series of vertically spaced horizontal sweep lines which are offset from the previous field of horizontal lines by a space corresponding to a phase differential between the pulses 10 and 11. Stated in other words, a difference in time relation between the pulses 10 and 11 will serve to interlace the scanning for one complete picture frame having a time duration of 1/30 of a second.

Figure 2:
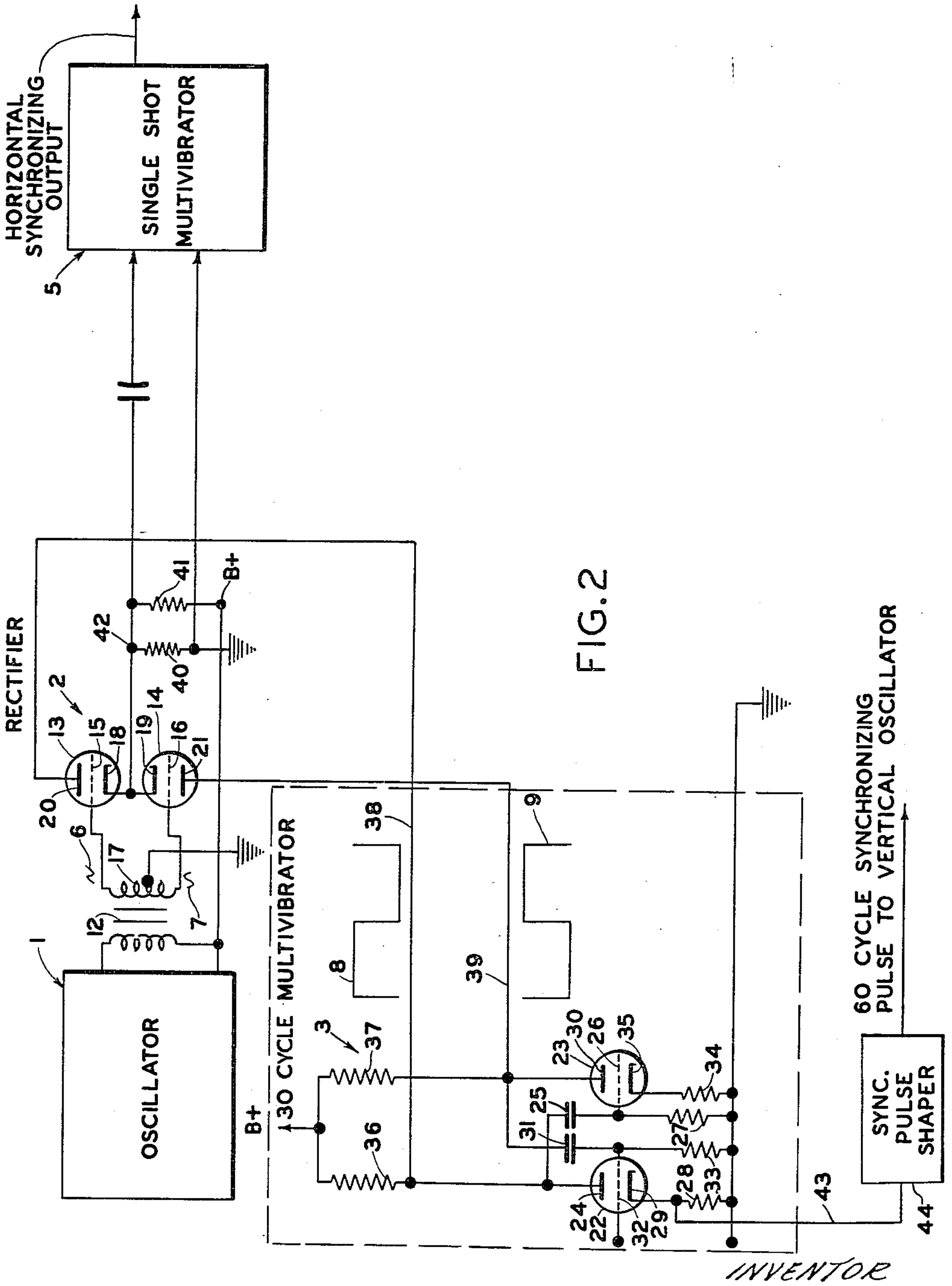
Fig. 2 is a circuit diagram of the embodiment of Fig. 1.

Referring now to Fig. 2, suitable detail circuitry for accomplishing the aforementioned operation is shown.

The oscillator 1 may consists of any well known oscillator having a good degree of frequency stability. A suitable oscillator would be of the crystal controlled variety which is noted for its frequency stability characteristics. The output of this oscillator is coupled through a transformer 12 to a full wave rectifier having triodes 13 and 14. The grids 15 and 16, respectively, of these triods are coupled to the opposite ends of the secondary 17 of the coupling transformer 12, and the cathodes 18 and 19 are connected toegther. The center of the transformer secondary 17 is connected to ground for a purpose which will become apparent hereafter.

Since a transformer is used to couple the energy from the oscillator 1 to the rectifier 2, the signal fed to the two grids 15 and 16 of the rectifier tubes will be of the same frequency but 180 degrees out of phase as shown.

These two triodes 13 and 14 are provided with anodes 20 and 21 respectively, connected as hereinafter described.

Referring now to the low frequency square wave multivibrator circuit 3, this circuit is also comprised of two triode space discharge tubes 22 and 23. This multivibrator is of the symmetrical type so that the circuit parts associated with the respective tubes will have the same values.

Considering the tube 22 portion first, the anode 24 is connected through capacitor 25 to the grid 26 of tube 23. A resistor 27 couples the capacitor 25 and the grid 26 to ground. A cathode resistor 28 connects the cathode 29 of tube 22 to ground potential.

In the circuit of tube 23, the anode 30 is coupled by means of capacitor 31 to the control grid 32 of tube 22. A resistor 33 connects capacitor 31 and grid 32 to ground. A resistor 34 connects the cathode 35 of tube 23 to ground potential.

Both anodes 24 and 30 of the two tubes 22 and 23 are fed through two resistors 36 and 37, respectively, from a common source of B-plus potential.

A 60 cycle low voltage alternating current source is preferably connected between the grid 32 and ground to provide the stabilizing influence for insuring a stabilized 30 cycle output from the multivibrator 3.

A pair of coupling lines 38 and 39 are connected, respectively, to anodes 24 and 30 and also to the rectifier anodes 20 and 21.

In the rectifier circuit, a cathode resistor 40 is connected between the cathodes 18, 19 and ground. Another resistor 41 is coupled between these cathodes and the source of B-plus potential. The output of the rectifier, which feeds the single shot multivibrator 5, may be taken from the ends of the cathode resistor 40.

The circuit just described may be explained as operating in the following manner. With reference to the square wave generator 3, let it be assumed first that the tube 22 is non-conductive and the tube 23 is conductive. In accordance with the usual operation of multivibrator circuits during this conducting condition, the storage capacitor 25 will be taking on a charge while the storage capacitor 31 is giving up its charge. As the charge on capacitor 31 is almost dissipated, the flow of current through the resistor 33 diminishes and reduces the bias on grid 32 which allows the tube 22 to become conductive. Conversely, as the charge on condensor 25 nears its maximum value, a negative potential will be impressed on grid 26 of tube 23 making the latter non-conductive. In accordance with the operation of the usual symmetrical multivibrator circuits, each time one or the other of the two grids 26 and 32 are made alternately conductive and non-conductive, a pulse of voltage will be produced which will have a waveform such as that represented by the curves 8 and 9. In the usual manner, the synchronizing input voltage fed to the grid 32 is utilized in a 2 to 1 ratio to stabilize the square wave outputs 8 and 9 to substantially 1/30 of a second for a complete cycle.

Referring now to the rectifier circuit 2, each time a positive pulse of voltage 8, for example, is fed to the anode 20, the tube 13 is made conductive of whatever potential is impressed on the control grid 15. This circuit is arranged such that only the positive cycles derived from the oscillator 1 are conducted during the period the positive pulse of wave 8 is fed to the anode 20, and this conduction is characterized by the passage of current through the cathode resistor 40 which corresponds to the positive portions of the signal 6. During this period of conduction, the negative half cycle of the wave 9 is fed to the anode 21 of the tube 14 thereby disabling the latter and making it non-conductive. The positive pulses, therefore, of the oscillator which are fed to the grid 15 of the tube 13 may be obtained from the end 42 of the resistor 40 and used as synchronizing pulses for the succeeding horizontal sweep circuitry.

For the next cycle of operation wherein the anode 20 is fed a negative pulse and the anode 21 is fed a positive pulse, the positive pulses fed to the grid 16 will be conducted through resistor 40 and appear in the output 42. Now, since the positive pulses for the two sinewaves fed to the grids 15 and 16, respectively, are 180 degrees out of phase, it is seen that the pulses obtained at output 42 during the positive half cycle of wave 8 will be 180 degrees offset from the pulses obtained at the same place during the positive period of square wave 9.

A connection 43 may be taken from the cathode 29 of the multivibrator tube 22 and used in synchronizing conventional the vertical sweep circuits in the customary manner. The frequency of the signal derived from this cathode will correspond to the synchronizing signal applied to the grid 32, and in the example given, will be 60 cycles per second. Each cycle of this cathode signal may be shaped by means of a conventional pulse shaper circuit 44 to obtain a synchronizing pulse which may be used to operate a conventional vertical scanning generator, or oscillator for producing the necessary 60 cycle per second vertical sweep wave.

While a multivibrator has been specified as the circuit to be used as the source 3, other circuits will, of course, occur to the person skilled in the art for obtaining the necessary waves 8 of the proper shape and duration.

What is claimed is:

1. A device of the character described comprising an oscillator delivering sine waves at a predetermined horizontal line-scanning frequency, source means delivering square waves at a predetermined vertical field-scanning frequency, a keyed rectifier circuit coupled to said oscillator and to said means and responsive to said field-scanning waves to pass only the one-half cycle portions of the oscillator sine waves, means coupled to said rectifier for utilizing said one-half cycle portions for generating horizontal line-scanning impulses at the frequency of occurrence of said portions, and means coupled to said source means for obtaining a signal having a frequency twice that of said field-scanning frequency.

2. A device of the character described comprising an oscillator delivering sine waves at a predetermined horizontal line-scanning frequency, source means delivering square waves at a predetermined vertical field-scanning frequency, a keyed rectifier circuit coupled to said oscillator and to said means and responsive to said field-scanning waves to pass only one half cycle portions of the oscillator sine waves, and means coupled to said rectifier for utilizing said one half cycle portions for generating horizontal line-scanning impulses at the frequency of occurrence of said one-half cycle portions.

3. A synchronizing circuit for use in television systems comprising a first high frequency source of alternating voltage for generating two waves which are 180 degrees out of phase with each other, a second low frequency source of alternating voltage for generating two waves which are also 180 degrees out of phase with each other, and gating circuit means symmetrically coupled to said first and second sources and operative to generate a sequential series of pulses corresponding to the positive portions of said two first source waves by conducting the positive portions of one of said first source waves during only the occurrence of the positive portion of one of said second source waves and then conducting the positive portions of the other of said first source waves during only the occurrence of the positive portion of the other of said second source wave.

4. A synchronizing circuit for use in television systems comprising a first high frequency source of alternating voltage having two output circuits providing two signal waves which are 180 degrees out of phase, a second low frequency source of alternating voltage having two output circuits providing two signal waves which are also 180 degrees out of phase, and a full wave rectifier circuit comprising two space discharge tubes having respectively anode and control grid electrodes, the two first source output circuits being coupled to respective ones of said grid electrodes, the two second source output circuits being coupled to respective ones of said anode electrodes, said tubes being alternately conductive during the respective positive half cycle of said second source signal waves and each conductive tube conducting only the positive half cycle of the first source signal wave.

5. A synchronizing circuit for use in television systems comprising a first high frequency source of alternating voltage having two output circuits providing two signal waves which are 180 degrees out of phase, a second low frequency source of alternating voltage having two output circuits providing two signal waves which are also 180 degrees out of phase, and a full wave rectifier circuit comprising two space discharge tubes having respectively anode and control grid electrodes, the two first source output circuits being coupled to respective ones of said grid electrodes, the two second source output circuits being coupled to said anode electrodes, each tube being conductive only during the positive half cycle of the second source signal wave fed thereto, and each instantaneously conductive tube being conductive of the positive half cycle of only the first source signal wave.

6. A synchronizing circuit for use in horizontal sweep circuits in television systems for obtaining interlace scanning comprising a first high frequency source of alternating voltage having two output circuits providing two signal waves which are 180 degrees out of phase, a second low frequency source of alternating voltage having two output circuits providing two signal waves which are also 180 degrees out of phase, said second source being operative to provide substantially square wave signals, and a full wave rectifier circuit comprising two space discharge tubes having respectively anode and control grid electrodes, the two first source output circuits being coupled to respective ones of said grid electrodes, the two second source output circuits being coupled to said anode electrodes, said tubes being alternately conductive during the respective positive half cycle of said second source signal waves and each instantaneously conductive tube conducting only the positive half cycle of the first source signal wave fed thereto, whereby two sequentially occurring fields of pulses will be produced for horizontal scanning with the pulses of one field spaced 180 degrees from the pulses of the other field.

7. A synchronizing circuit for use in horizontal sweep circuits in television systems for obtaining interlace scanning comprising a first high frequency source of alternating voltage operative to produce two signal waves which are 180 degrees out of phase, a second low frequency source of alternating voltage operative to produce two signal waves which are also 180 degrees out of phase, said second source being operative to provide substantially square wave signals, a full wave rectifier circuit comprising two space discharge tubes having respectively anode and control grid electrodes, said control grid electrodes being coupled to said first source for impressing the two first source signal waves onto said grid electrodes respectively, said anode electrodes being coupled to said second source for impressing the second source signal waves onto said anode electrodes respectively, each tube being conductive only during the positive half cycle of the second source signal wave fed thereto, and each instantaneously conductive tube being conductive of the positive half cycle of only the first source signal wave fed thereto, whereby two sequentially occurring fields of pulse will be produced with the pulses of one field spaced 180 degrees from the pulses of the other field, and means included in said second source for producing a synchronizing signal having a frequency equal to twice that of the second source signals.

8. A synchronizing circuit for use in television systems to obtain interlace scanning comprising a first high frequency source of alternating voltage operative to produce two signals which are 180 degrees out of phase, a second low frequency source of alternating voltage operative to produce two sginals which are also 180 degrees out of phase, a full wave rectifier circuit comprising two space discharge tubes having respectively anode and control grid electrodes, means coupling said first source to said grids for supplying said two first source signals to said grids respectively, the second source being coupled to said anode electrodes for supplying said two second source signals to said anodes respectively, each tube being conductive only during the positive half cycle of the second source signal fed thereto, and each conducting tube being conductive of the positive half cycle of only the first source signal fed thereto for producing two sequentially occurring fields of pulses with the pulses of one field spaced in time relation with respect to the pulses of the other field, and signal producing means associated with said second source operative to provide a synchronizing signal having a frequency twice that of the frequency of one of the second source signals, each of said fields occurring during one half cycle of said synchronizing signal.

9. A synchronizing circuit for use in television scanning systems comprising a first high frequency source of alternating voltage operative to produce two signals which are 180 degrees out of phase, a second low frequency source of alternating voltage operative to produce two signals which are also 180 degrees out of phase, and rectifying means coupled to the said first and second sources and comprising two rectifier sections controlled by respective ones of said first source signals and respective ones of said second source signals, means whereby each section is conductive only during the positive half cycle of the second source signal fed thereto, and each conducting section being conductive of only the positive half cycle of the first source signal fed thereto.

10. An interlace scanning synchronization circuit for use in television systems comprising a high frequency oscillator for generating a sinusoidal signal as a source of horizontal sweep synchronizing voltage, a coupling transformer connected to said oscillator and operative to provide two sinusoidal signals 180 degrees out of phase with each other, a low frequency square wave generator operative to provide two square wave signals which are also 180 degrees out of phase with each other and a vertical sweep synchronizing voltage, a full wave gated rectifier coupled to said transformer and said generator and comprising two space discharge tubes having control grid and anode elements respectively, the grid elements being supplied respective ones of said two transformer signals, the anode elements being supplied respective ones of said two square wave signals, means whereby each tube is conductive only during the positive half cycle of the square wave signal fed thereto, and each conducting tube being conductive of only the positive half cycle of the transformer signal fed thereto, and a coupling circuit included in said rectifier for providing two sequentially occurring horizontal sweep synchronizing fields, each field consisting of a series of pulses corresponding to the positive half cycles of a respective one of said two transformer signals, and the pulses in successive fields being spaced apart in time an amount corresponding to the phase differential between the two transformer signals.

11. An interlace scanning synchronization circuit for use in television systems comprising a high frequency oscillator for generating a signal as a source of horizontal sweep synchronizing voltage, inductive coupling means connected to said oscillator and operative to provide two signals 180 degrees out of phase with each other, a signal source operative to provide two square wave signals which are also 180 degrees out of phase with each other and a vertical sweep synchronizing signal, and a full wave gated rectifier coupled to said inductive means and said signal source and comprising two space discharge tubes having input and output electrodes respectively, the input electrodes being supplied respective ones of the two signals of said means, the output electrodes being supplied respective one of said two square wave signals, means whereby each tube is conductive only during the positive half cycle of the square wave signal fed thereto, and each conducting tube being conductive of only the positive half cycle of one of the two signals of said means, whereby two sequentially occurring fields of pulses will be produced with the pulses of one field being spaced in time relation 180 degrees from the pulses of the other field, said vertical synchronizing signal having a frequency corresponding to the sequential occurrence of two fields for obtaining synchronized interlace-scanning signals.

12. A synchronizing circuit for use in television systems comprising first means for producing two wave trains of identical frequency which are out of phase with each other, second means for producing two alternating waves which are 180 degrees out of phase with each other, gating means operatively coupled to both said first and second means, said gating means including first and second circuits, the first circuit being rendered alternately conductive and non-conductive by the alternate half cycles of one of said alternating waves, said first circuit rectifying one of said wave trains during its conductive period, the second circuit being rendered alternately conductive and non-conductive by the alternate half cycles of the other of said alternating waves, said first and second circuits being alternately conductive, said second circuit rectifying the other of said wave trains during its conductive period.

13. A synchronizing circuit for use in television systems comprising first means for producing two wave trains of identical frequency which are out of phase with each other, second means for producing two alternating waves which are 180 degrees out of phase with each other, gating means operatively coupled to both said first and second means, said gating means including first and second circuits which are rendered oppositely conductive and non-conductive in response to said two alternating waves respectively, said first and second circuits rectifying said two wave trains respectively during the conductive periods thereof.

14. A synchronizing circuit for use in television systems comprising a first source of unidirectional pulses which are uniformly spaced apart, a second source of unidirectional pulses of the same frequency and spacing as said first source pulses, said first and second pulses occurring alternately with respect to each other, circuit means for utilizing said pulses, and means for gating alternately a series of first and second source pulses to said circuit means, the number of pulses in each series being substantially the same.

15. A synchronizing circuit for use in television systems comprising a first source of alternating waves, a second source of alternating waves of the same frequency as said first source waves but 180 degrees out of phase therewith, and a gating circuit operatively coupled to said first and second sources for producing a signal of given frequency which is less than the frequency of said alternating waves and for rectifying in time alternation said first and second source waves, the rectification period of the first and second source waves being equal to one-half cycle of said signal.

16. A synchronizing circuit for use in television systems comprising a first high frequency source of alternating voltage having two output circuits providing two signal waves which are 180 degrees out of phase, a second low frequency source of alternating voltage having two output circuits providing two signal waves which are also 180 degrees out of phase, and a full wave rectifier circuit comprising two electron discharge devices having respectively electron-collecting and control electrodes, the two first source output circuits being coupled to respective ones of said control electrodes, the two second source output circuits being coupled to respective ones of said electron-collecting electrodes, said devices being alternately conductive during the respective positive half cycle of said second source signal waves and each instantaneously conductive device conducting only the positive half cycle of the first source signal wave.

References Cited in the file of this patent

UNITED STATES PATENTS

| | | |
|---|---|---|
| 2,535,247 | White | Dec. 26, 1950 |
| 2,628,279 | Roe | Feb. 10, 1953 |